(12) United States Patent
Shragge

(10) Patent No.: US 7,540,508 B2
(45) Date of Patent: Jun. 2, 2009

(54) SUBMERSIBLE ON-SHORE SCUBA MOBILITY DEVICE AND SYSTEM

(76) Inventor: S. Alexander Shragge, 5308 E. Palisades Rd., San Diego, CA (US) 92116

( * ) Notice: Subject to any disclaimer, the term of this patent is extended or adjusted under 35 U.S.C. 154(b) by 855 days.

(21) Appl. No.: 10/871,166

(22) Filed: Jun. 17, 2004

(65) Prior Publication Data
US 2004/0255938 A1    Dec. 23, 2004

Related U.S. Application Data

(60) Provisional application No. 60/479,140, filed on Jun. 17, 2003.

(51) Int. Cl.
*B62B 1/12*    (2006.01)
(52) U.S. Cl. .................. 280/47.33; 280/79.5; 220/737; 248/311.2
(58) Field of Classification Search ................ 16/18 R, 16/45; 280/47.131, 47.32, 47.331, 47.33, 280/79.5; 248/129, 310, 311.2; 220/400, 220/737
See application file for complete search history.

(56) References Cited

U.S. PATENT DOCUMENTS

| | | | | |
|---|---|---|---|---|
| 2,510,754 A | * | 6/1950 | Norlin | 280/38 |
| 2,729,843 A | * | 1/1956 | Seek | 15/246.4 |
| 3,809,353 A | * | 5/1974 | Good et al. | 248/346.11 |
| 3,929,312 A | * | 12/1975 | Uke | 248/346.11 |
| 4,753,445 A | * | 6/1988 | Ferrare | 280/47.131 |
| 5,292,140 A | * | 3/1994 | Laing | 280/47.33 |
| 5,323,887 A | * | 6/1994 | Scicluna et al. | 190/18 A |
| D373,667 S | * | 9/1996 | Hunsaker | D34/15 |
| 6,513,816 B1 | * | 2/2003 | Kijima | 280/47.26 |

* cited by examiner

*Primary Examiner*—Christopher P Ellis
*Assistant Examiner*—John D Walters
(74) *Attorney, Agent, or Firm*—The Nath Law Group; Jonathan A. Kidney; Robert P. Cogan

(57) ABSTRACT

A scuba tank mobility device and a system comprise a cup member that may be fitted directly over the scuba tank or over a scuba tank boot. A roller member is mounted to rotate with respect to the cup member and positioned vertically with respect to bottom of the cup member so that the roller permits standing support of the scuba tank. The tank is tilted from the standing position to place weight on the roller member for transport. The cup member comprises a projection radially outside its diameter to limit rolling of the scuba tank when on its side. In a further form, a handle may be attached to the cup member and extend axially therefrom. The cup member and handle are dimensioned to provide minimal projection from the contour of the scuba tank, whereby potential for a tangling with underwater vegetation and other objects is minimized.

12 Claims, 19 Drawing Sheets

SUBMERSIBLE ON-SHORE SCUBA MOBILITY DEVICE AND SYSTEM

CROSS REFERENCE TO RELATED APPLICATIONS

The present application claims priority from Provisional Patent Application 60/479,140 filed Jun. 17, 2003, the disclosure of which is incorporated by reference herein.

BACKGROUND OF THE INVENTION

The present invention relates to a device and system providing for scuba tank transport over land and particularly to a system in which the device may remain connected to the scuba tank during diving.

Self-contained underwater breathing apparatus (SCUBA) comprises a cylindrical gas bottle. The cylinder generally has a circular cross section centered about a central axis. Scuba tanks having other cross sections have been provided in the prior art as well. Commonly, the gas bottle is made of steel. Aluminum gas bottles have also been provided. Generally, one end of the cylinder is substantially flat and an opposite end of the cylinder has a dome shape. The center of the dome has an internally threaded aperture that receives a valve assembly. The valve assembly includes an elongated nipple end that is coaxial with the cylinder's central axis and a valve extending through the nipple end mounted substantially normal to the central axis. The valve may include a regulator. Alternatively, the regulator may external to the scuba tank and be coupled to the valve. Air hoses and a mask are coupled to the valve assembly for use in underwater breathing. Scuba tanks are manufactured in a variety of standardized sizes.

A nominal weight for a scuba tank fully charged with air (or other oxygen-containing mixture) is 30 lbs. When the scuba tank is deployed underwater, the weight of the scuba tank is not of concern to a diver. Due to displacement of water, the weight felt by the diver is reduced. Also, divers need to wear weights to offset their own buoyancy. Consequently, the weight of the scuba tank does not adversely affect mobility of a diver in the water. However, on land, the full weight of the scuba tank must be supported. A user may wish to have a convenient way of transporting the scuba tank from one place to another, for example as from a parking lot to a boat marine on a dock, rather than having to carry the scuba tank. A user may need to transport a scuba tank across a parking lot, on a beach or along a dock, for example. Many prior art carriages have been provided for transporting a scuba tank. These carriages include dollies and hand trucks. These carriages are not normally assembled to the scuba tank when then tank is being transported to a diving area, e.g., in the trunk of a car. They must be removed from the scuba tank prior to diving.

Prior art carriages are generally stored in transport containers, e.g., car trunks, separately from the scuba tanks. If a the scuba tank is placed in the transport container by itself, the scuba tank is subject to rolling due to its circular cross section. Rolling of the scuba tank can cause damage to it or the container. One way to avoid rolling is by providing a separate device to prevent rolling or a separate box or other enclosure in to which to fit the scuba tank. Use of additional devices presents added inconvenience and expense in preventing the scuba tank from rolling.

When a diver reaches a destination, the scuba tank must be assembled to the carriage prior to transporting the scuba tank to a point at or near which the diver will enter the water. Then the scuba tank must be dissembled from the carriage.

The diver must then carry the tank from the place of disassembly from the carriage to the location at which the scuba tank will actually be donned. Divers will generally enter the water from a dock, a beach or a boat. They may find it very inconvenient to have to carry the scuba tank from a place of secure storage for a carriage to a water entry point. If they use the carriage to get to the water entry point, the must leave the carriage unattended while diving. Carriages left on a dock may provide an inconvenience or safety hazard to other users of the dock. There may be not article on the dock to which the carriage can be secured. In this case, the carriage could be used or removed by others while the diver is away from the dock. If entering the water from a beach, a diver would have to be able to return to the same spot on the beach from the water to find the carriage and avoid carrying the scuba tank over the beach. On some boats, lack of stowage space may result in great inconvenience in stowing the carriage. On a diving party boat, a number of carriages would have to be stowed, and divers would encounter the usual inconveniences associated with baggage retrieval to find their own carriages.

Carriages are not suited for remaining attached to the scuba tank during diving. Their dimensions create the potential for snagging should a swimmer pass through vegetation. Their shapes could project into a volume to be occupied by the body of a diver were they to be strapped to a diver's body.

SUMMARY OF THE INVENTION

It is a general advantage of embodiments of the present invention to provide a device and system of which is simple in construction and permits on-shore transport of a scuba tank.

It is a particular advantage of embodiments of the present invention to provide a device and system of the type described which acts as an aid in stabilizing a scuba tank during transport of the scuba tank in a container.

It is another particular advantage of embodiments of the present invention to provide a device and system providing on-shore mobility for a scuba tank and which may also be conveniently left affixed to a scuba tank during diving.

Briefly stated, in accordance with embodiments of the present invention, there are provided a scuba tank mobility device and a system comprising a scuba tank in a mobility device. The transport device is mountable to a first end of a scuba tank remote from a second, valve end of the scuba tank. The first end is often referred to for purposes of the present description as the lower end since it will be on the bottom when the scuba tank is vertically disposed. The transport device fits over the first end of the scuba tank and includes a cup member. The cup member may be fitted directly over the scuba tank or over a scuba tank boot. A tank boot is a flat-bottomed, usually plastic, vinyl or rubber device that fits over the lower end of a scuba tank, allowing the tank to stand up. The boot also protects the bottom of the scuba tank from abrasion and provides some degree of cushioning of the impact of a tank when it strikes a surface. A roller member is mounted to rotate with respect to the cup member and positioned vertically with respect to bottom of the cup member so that the roller permits standing support of the scuba tank. Tilting may be achieved by applying a force to the nipple end of the scuba tank. The tank is tilted from the standing position to place weight on the roller member. Tilting may be achieved by applying a force to the nipple end of the scuba tank. In one form, retaining strap axially surrounds the scuba tank and is axially displaced from the cup member. A connecting member connects the cup member to the retaining strap. The cup member comprises a projection to limit rolling of the scuba tank when its axis is substantially horizontal. In a further form, a handle may be attached to the cup member and extend axially therefrom. The handle may be opened to extend past the valve end of the scuba tank and fold to have a radial extent less than that of the scuba tank. The cup member and handle are dimensioned to provide minimal projection from the contour of the scuba tank, whereby potential for a tangling with underwater vegetation and other objects is minimized.

While this Summary of the Invention section lists various aspects of varying embodiments of the present invention, there are other aspects of the present invention, or preferred embodiments thereof, apparent from the following description. This Summary is neither exhaustive nor intended to be determinative of the scope of the invention.

BRIEF DESCRIPTION OF THE DRAWINGS

Embodiments of the invention are pointed out in the following description taken in connection with the following drawings.

Of the drawings:

FIGS. 9-17 illustrate a further embodiment of the present invention in which FIG. 9 is a front axonometric view;

FIG. 10 is a side elevation;

FIG. 11 is a front elevation;

FIG. 12 is a rear elevation;

FIG. 13 is a rear axonometric view;

FIG. 14 is a front axonometric view;

FIG. 15 is a plan view;

FIG. 16 is a bottom plan view;

FIG. 17 is a cross-sectional view taken along lines 17-17 of FIG. 15; and

DETAILED DESCRIPTION

Figure 1:
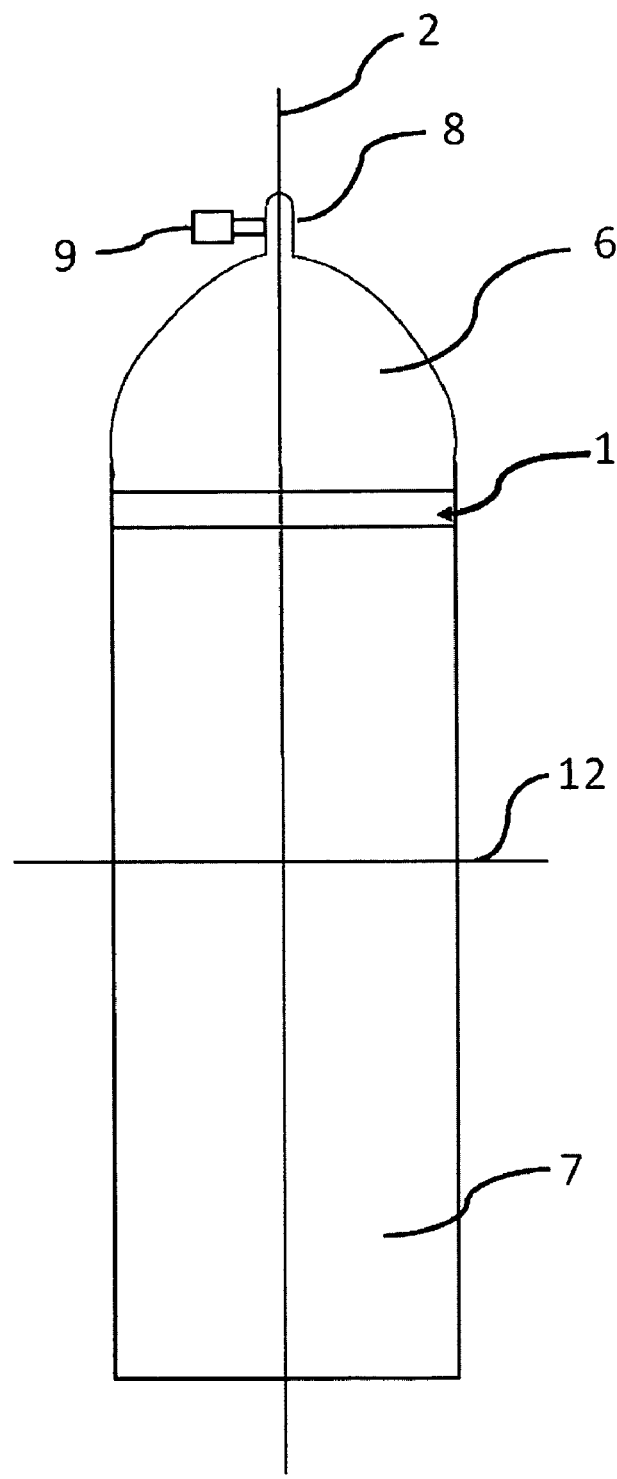
FIG. 1 is a side elevation of a device and system constructed in accordance with the present invention.

In the embodiment of FIG. 1, a scuba tank 1 has an axis 2. Scuba tanks generally comprise cylindrical gas bottles symmetrical about the axis 2. The scuba tank 1 has an upper end 6 and a lower end 7. The upper end 6 comprises top part 8 a control valve 9. Commonly, the lower end 7 is flat. The scuba tank 1 has a horizontal centerline 12 which is approximately a registration with a weight-balanced point of the tank 9 when it is weighed with the axis 2 in a substantially horizontal disposition.

Figure 2:
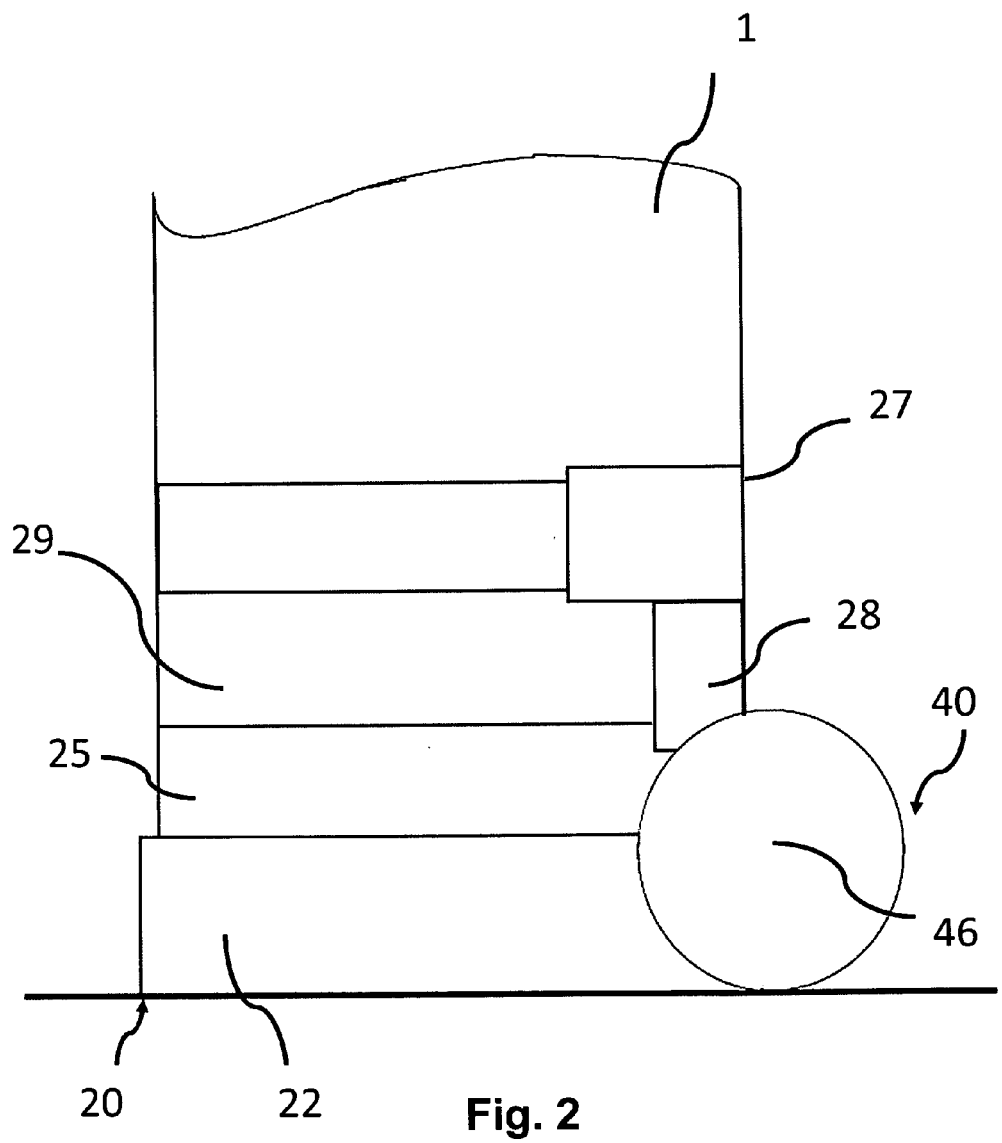
FIGS. 2 and 3 are a side elevation and a rear elevation of the embodiment of FIG. 1.

FIG. 2 is an elevation of the scuba tank 1 engaged in a mobility device comprising a transport carrier 20 constructed in accordance with an embodiment of the present invention.

Figure 3:
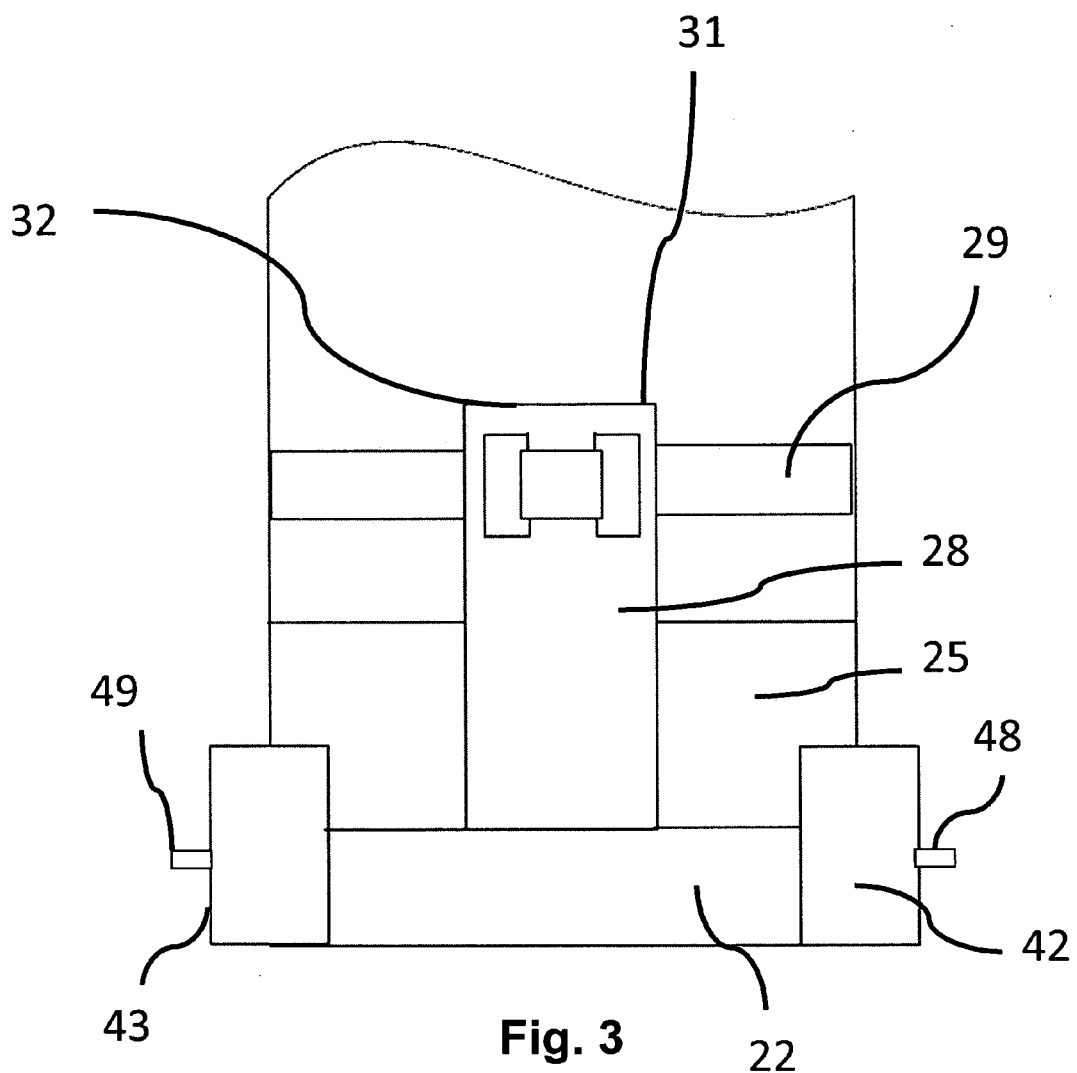
Figure 4:
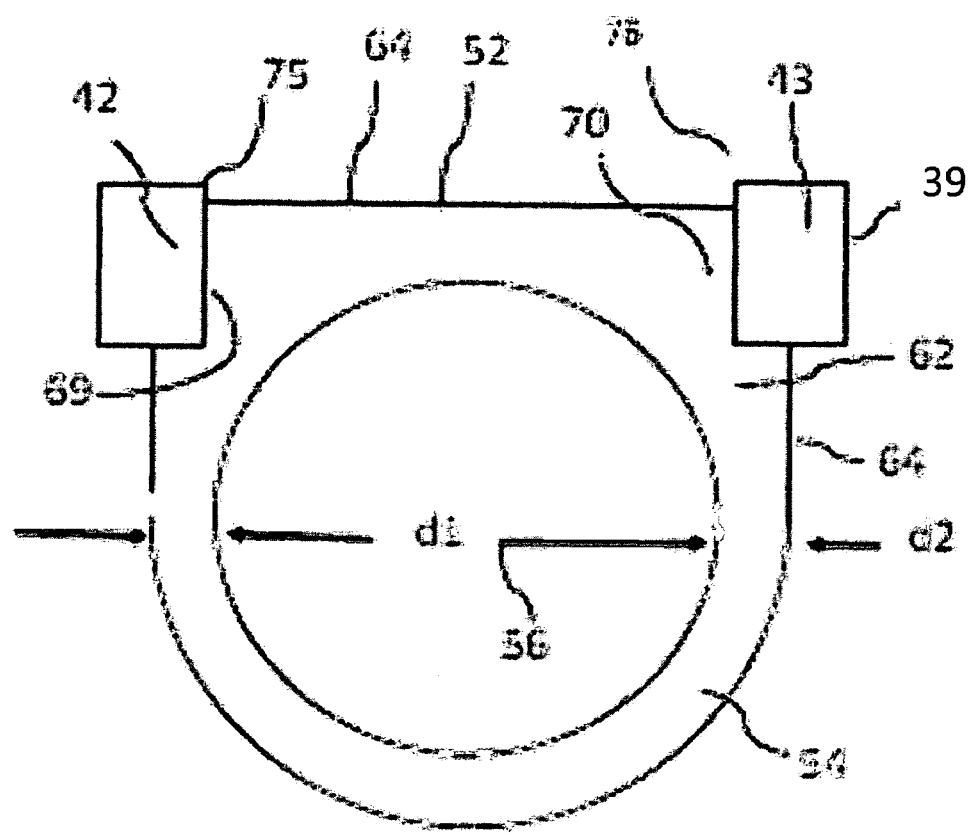
FIG. 4 is a plan view of a cap member to receive a lower end of a scuba tank.

FIG. 3 is a rear elevation of the scuba tank 1 partially broken away and engaged in the transport carrier 20. FIG. 4 is a plan view of the transport carrier 20 with the scuba tank 1 removed therefrom.

The transport carrier 20 comprises a platform section 22 supporting a cup member 25 which receives the lower end 7 of the scuba tank 1. A brace member 28 extends in an axial direction from the platform member 22 across the cup member 25 to an axial upper position 27, preferably below the vertical centerline 12. A strap member 29 is secured to the brace member 28 for maintaining the scuba tank 1 is engagement with the transport carrier 20. As seen in FIG. 3, the strap member 29 may be threaded through slots 31 and 32 at an upper portion of the brace member 28. A buckle 34 may be used to secure and loosen the strap 29.

For transport, a roller member 40 is provided supported to the platform 22. As seen in FIGS. 3 and 4, the roller member 40 may comprise first and second wheels 42 and 43, each placed on a different horizontal side of the brace 28. The roller member 40 is sized and positioned to permit the platform 22 to support the scuba tank 1 in a standing position. Additionally, the roller member 40 is vertically positioned to minimize tilting of the axis necessary to transfer weight from a bottom of the platform 22 to the roller member 40. In a preferred form, the outer diameter of the roller member 40 is tangent to the lower surface 23 of the platform 22. The wheels 43 and 42 may, for example, comprise urethane wheels. It is desirable to make them large enough to conveniently support the weight of the scuba tank 1 and small enough to minimize their contribution to the size of the transport carrier 20. In one suitable embodiment, the wheels 42 and 43 are 1½" wide and 4" in diameter. The roller member 40 rotates on an axis 46. Individual axial pins 48 and 49 may secure the wheels 42 and 43 respectively along the axis 46, as illustrated in FIG. 3. Alternatively, as illustrated in FIG. 4, a single axle 52 may be provided.

It is highly desirable to give the transport carrier 20 a contour such that the shape will minimize engagement with underwater vegetation or any other objects. To this end, projections from the transport carrier 20 are minimized. As seen in FIG. 4, the transport carrier 20 has an annular section 54 surrounding the "footprint" of the scuba tank 1 having an inner diameter d1 and an outer diameter d2 with a common center point 56. In order to avoid the use of projections, solid areas 62 and 63 extend from the annular portion 54 to the wheels 31 and 32. In one suitable embodiment, the areas 61 and 62 each comprise quadrants of a square having a center point 56 and a side d2 with the central area 53 removed therefrom. A side 64 of the square is substantially normal to the sides 63 and 64. Arrow shaped cutouts 69 and 70 may be provided adjacent the wheels 31 and 32 respectively. The cutouts 69 and 70 are cut out from corners of the quadrants 61 and 62. Additionally, bosses 75 and 76 may be provided diametrically interiorly of the wheels 31 and 32 respectively and extending radially away from the side 64 to cover portions of the wheels 31 and 32. In accordance with the present invention, the dimensions of the transport carrier 20 and wheels 31 and 32 are selected to provide sufficient size to support conveniently the weight of the scope of tank 1 out of the water for minimizing projections from the scuba tank so that the potential for tangling of the transport carrier 20 in the water is minimized.

It is noted that in the preferred form, the strap 29 is below the vertical centerline 12 because in customary scuba usage, other apparatus must be affixed thereabove. For example, a shoulder harness worn by the diver (not shown) is affixed above the centerline 12. This design further accommodates convenience of use.

Figure 5:
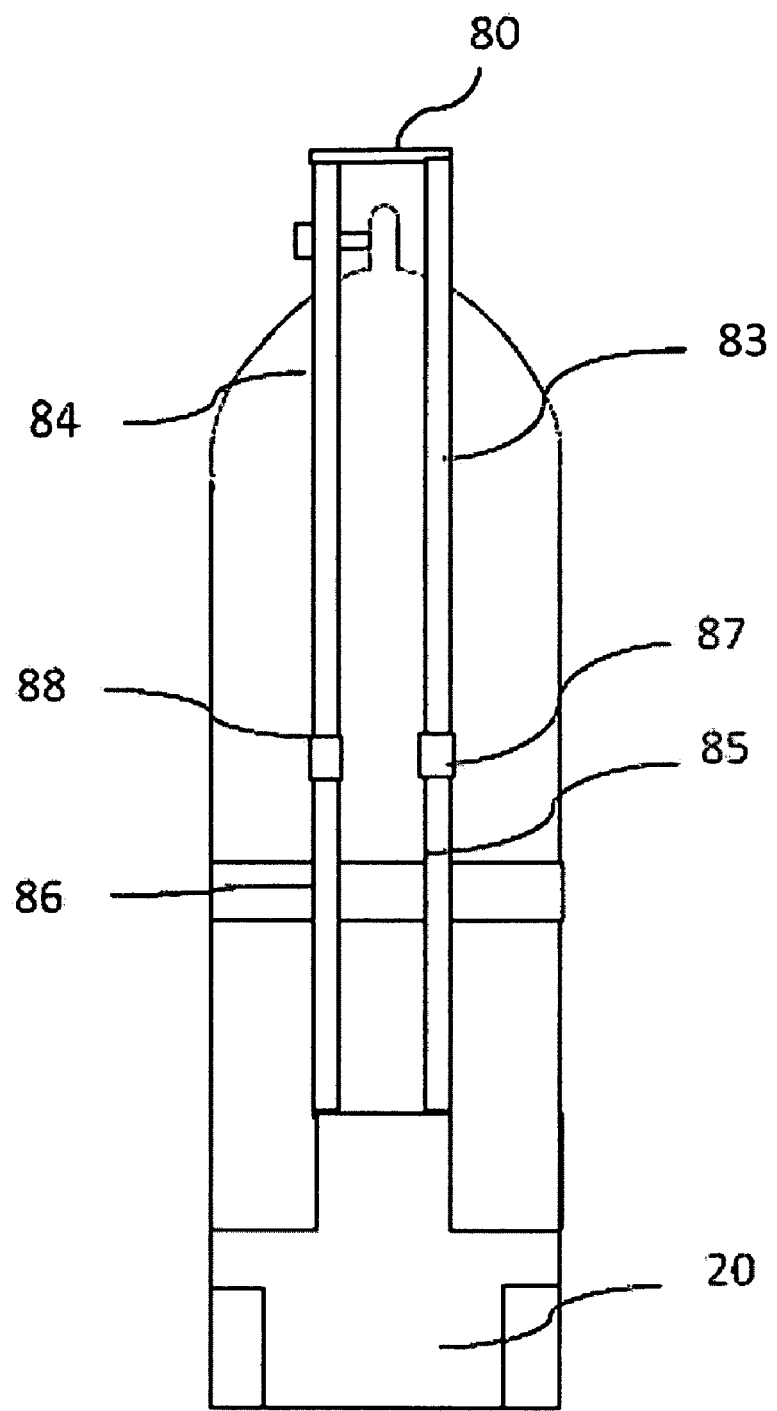
FIG. 5 is an elevation of a further embodiment of the present invention illustrating a handle in a first state.
Figure 6:
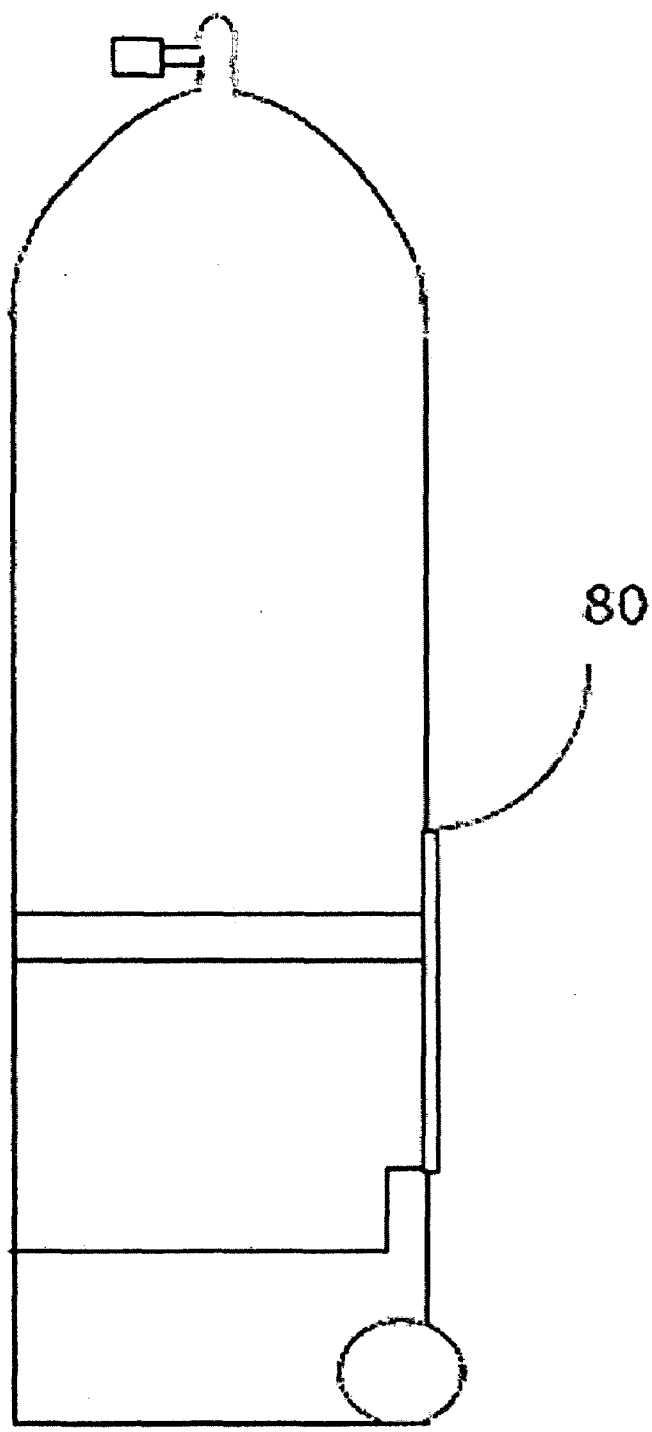
FIG. 6 is a side elevation of the apparatus of FIG. 4 illustrating the handle in a second state.

FIGS. 5 and 6 are rear and side elevations of a further embodiment of the present invention. The transport carrier 20 is mechanically coupled to a handle 80 so that a diver may grasp the handle 80 for transporting the scuba tank 1 rather than having to grasp the scuba tank by the top 6 or the valve 8. The handle 80 is substantially horizontally disposed to first and second arms 83 and 84 which telescope respectively within support arms 85 and 86. The support arms 85 and 86 are anchored in the platform 20. Securing means 87 at the top of arm 85 and securing means 88 at the top of arm 86 may be selectively moved between an open position which allows vertical sliding of the handle 80 in a closed position in which the position of the handle 80 is fixed. There are many well-known forms of such couplers. In one common form, they comprise threaded annular nuts which tighten bifurcated ends of the arms 85 and 86. For overland transport, the handle 80 is moved to its vertically top position for diving or for transport in a container such as car trunk, the handle 80 is moved to its lowest position and the arms 83 and 84 are received inside the arms 85 and 86.

Figure 7:
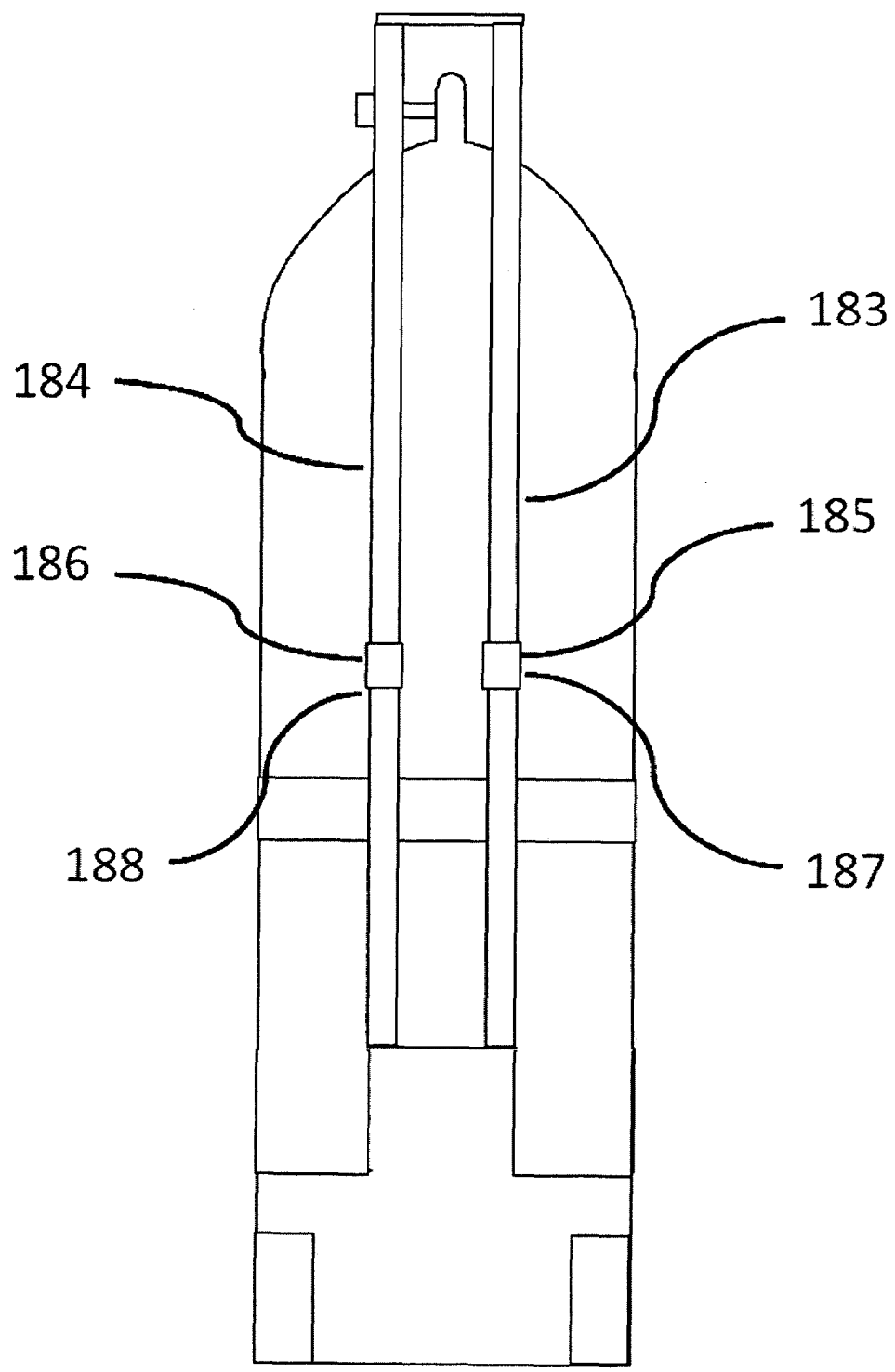
FIGS. 7 and 8 are a rear elevation and a side elevation of a further embodiment of the present invention in which a handle is provided for use in transport.
Figure 8:
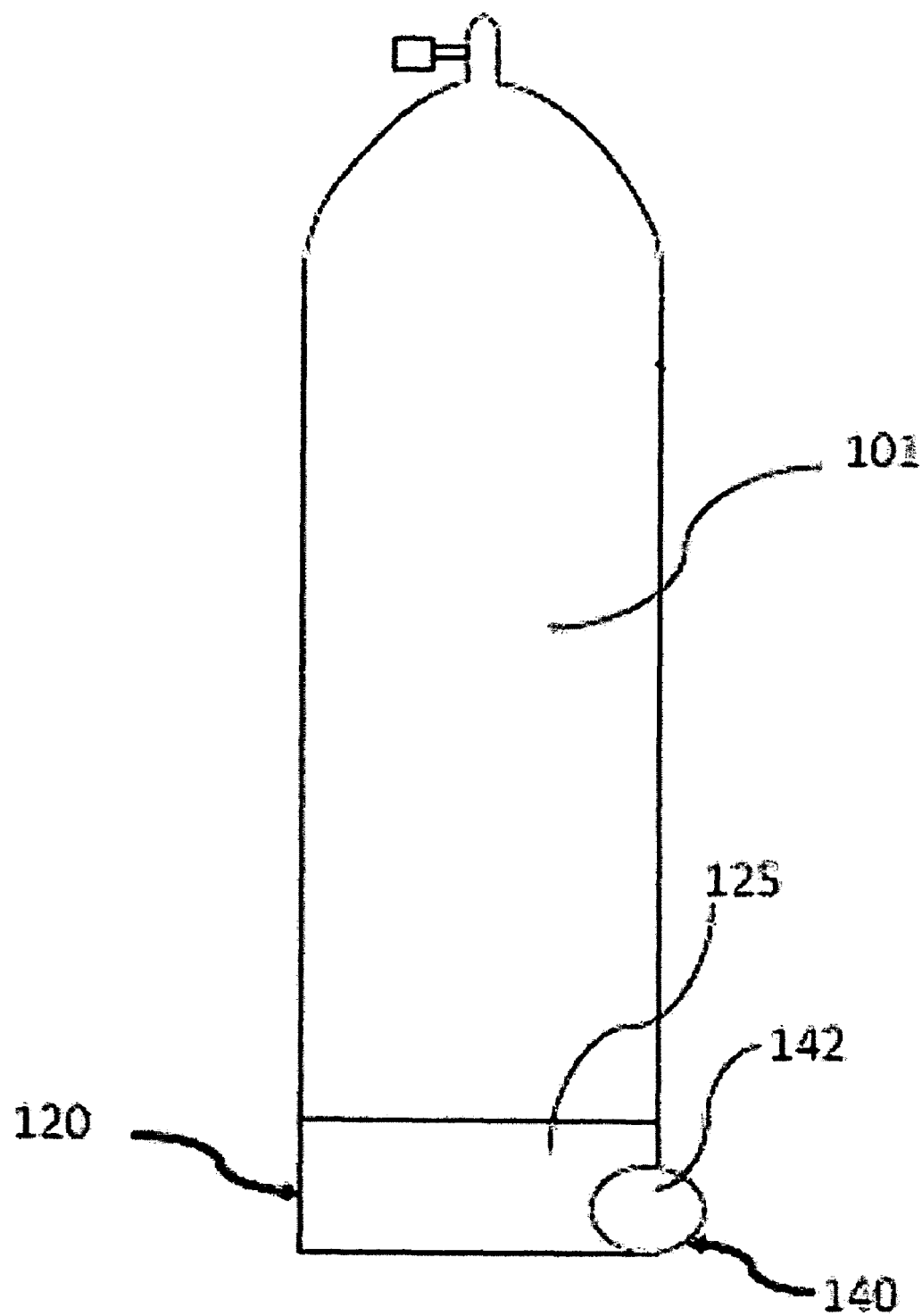
Figure 9:
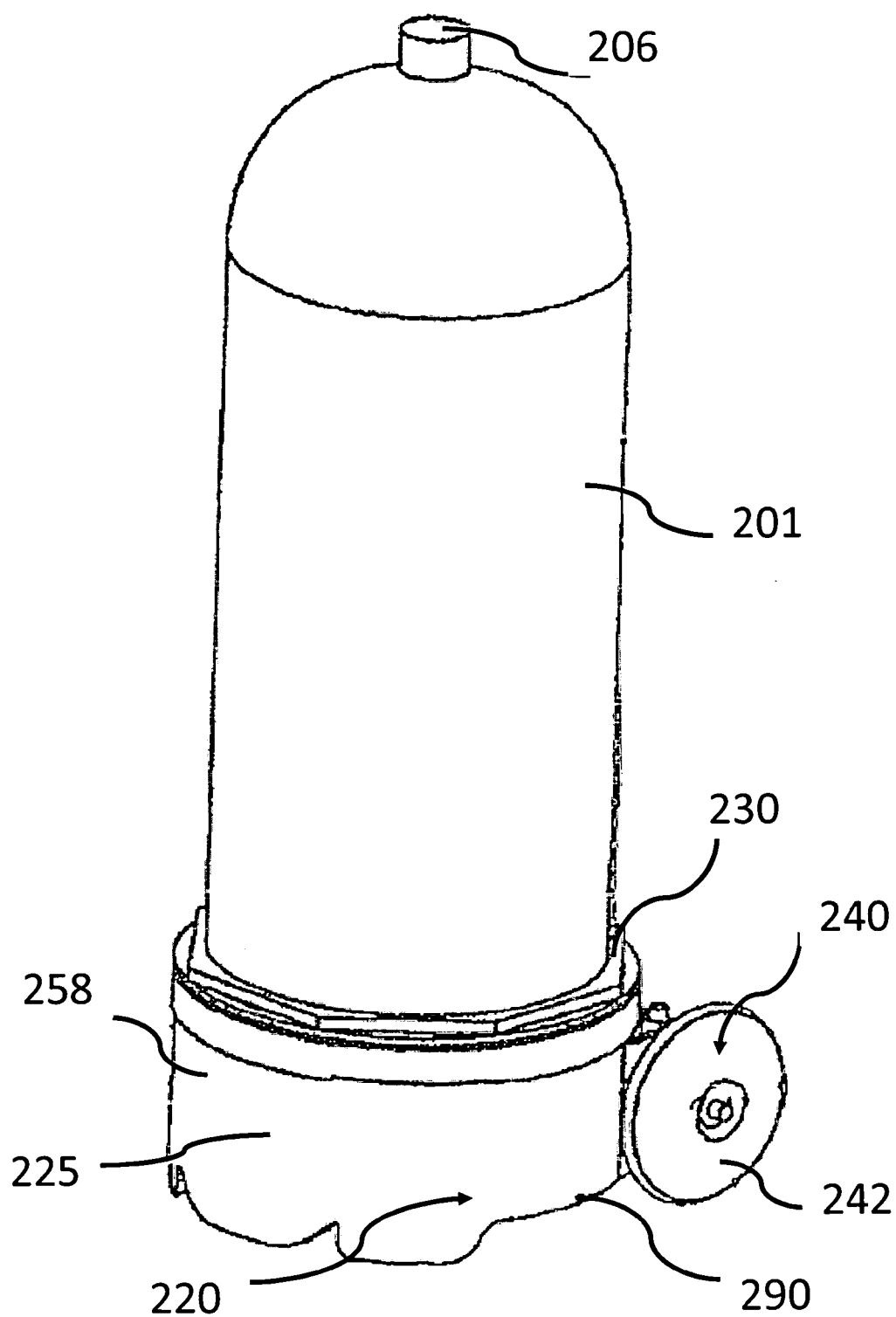

FIGS. 7 and 8 represent a further embodiment in which a handle 180 is affixed to arms 183 and 184 having upper ends joined by the handle 180 and lower ends anchored in the platform 22. Handles 183 and 184 include pivots 185 and 186 respectively. Additionally, locks 187 and 188 are provided for locking the handle assembly 178 in a closed position or an open position, the closed position being illustrated in FIG. 8.

The pivots 185 and 186 need not necessarily be placed below the vertical centerline 12. However, the pivots 185 and 186 should be below the point at which it is expected to attach the harness 17.

FIGS. 9-12 each represent a system 210 comprising a scuba tank 201 having a top 206 and a transport carrier 220 including a cup member 225. An intermediate member 230 may comprise a boot which a user has placed on the scuba tank 201. Alternatively, the intermediate member 230 may comprise a shim to be placed intermediate the transport carrier 220 and the scuba tank 201 for a user not having a boot on the scuba tank 201.

Figure 10:
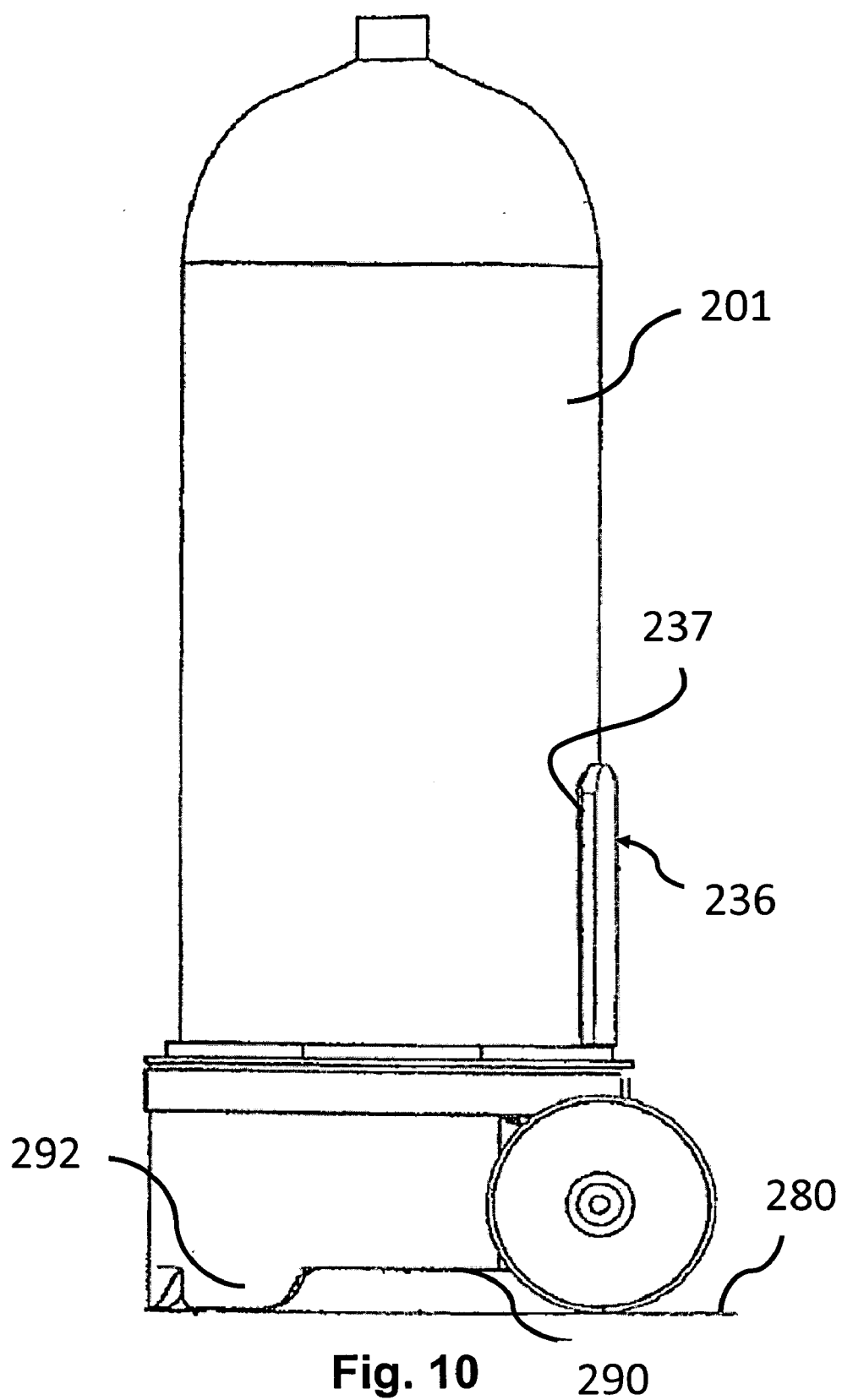
Figure 11:
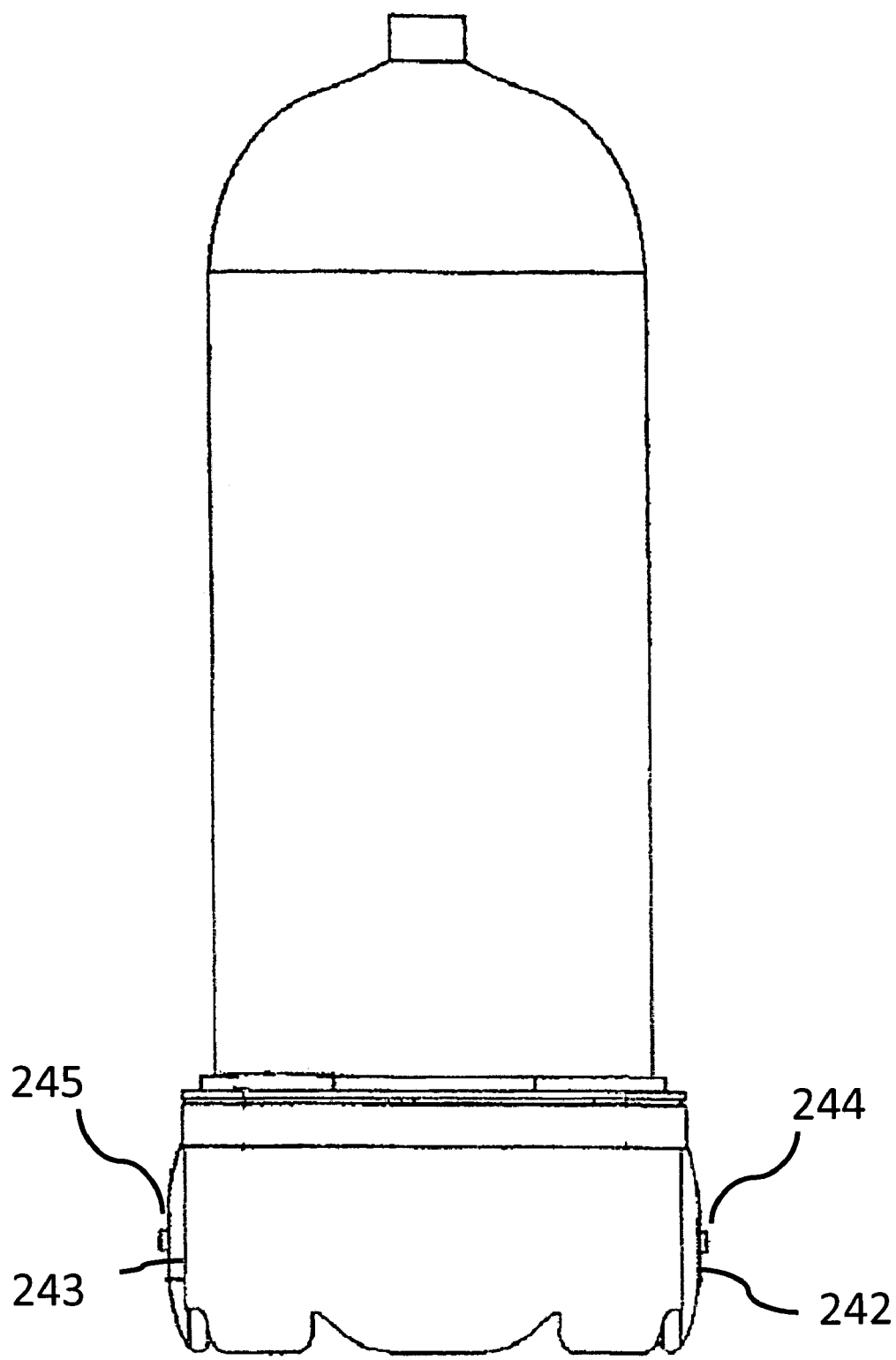
Figure 12:
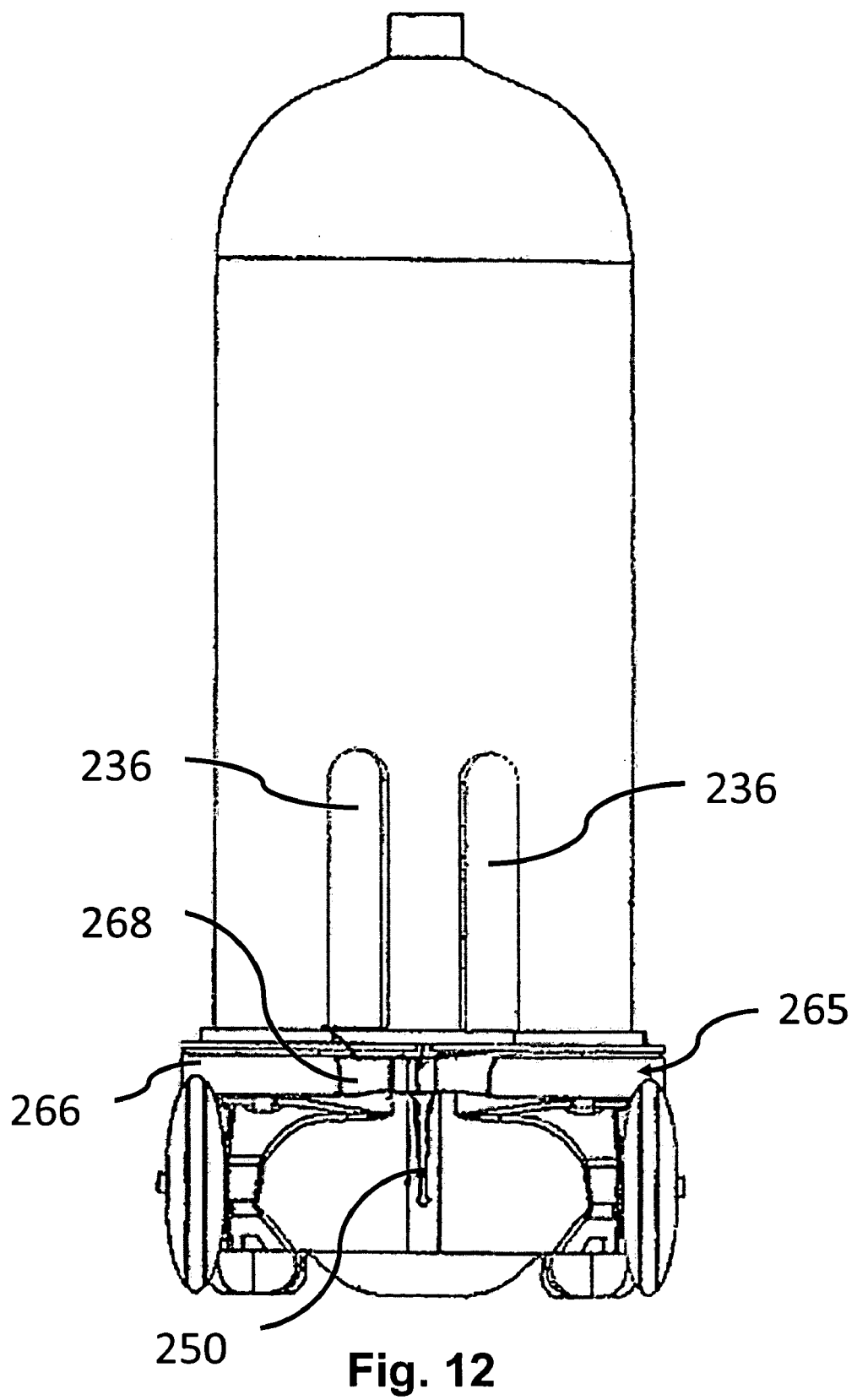
Figure 13:
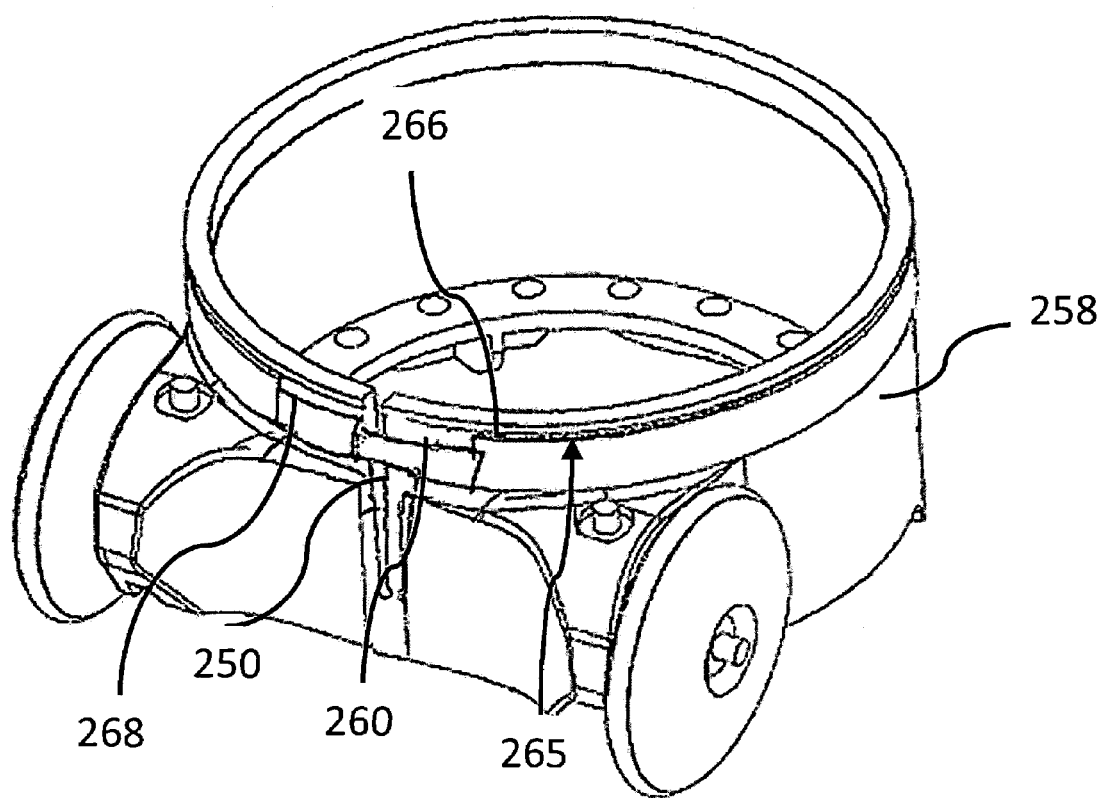
Figure 14:
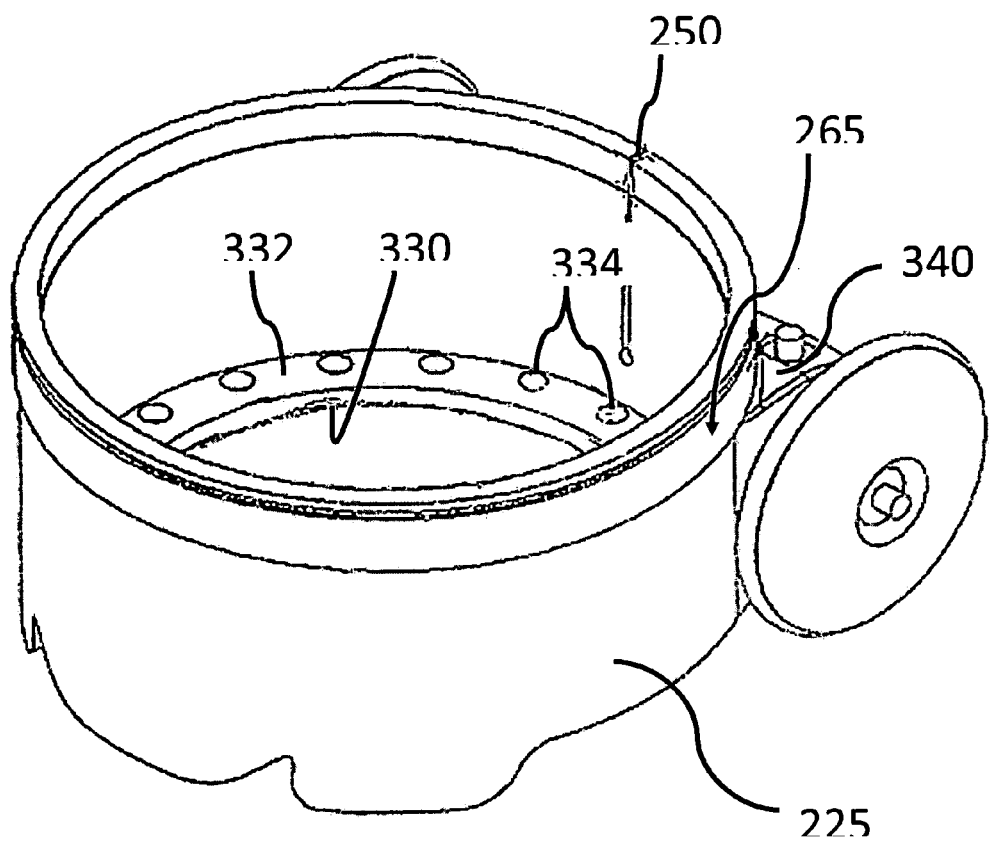

Additionally, as better seen in FIGS. 10 and 12, protector members 240 may be affixed to the scuba tank 201 to protect the scuba tank 201 when it is being rolled upstairs. The protector members 236 may be affixed to the scuba tank 201 by two-sided tape pieces 237. In the present embodiment, a roller member 240 comprises first and second wheels 242 and 243. The wheels are mounted to axle members 244 and 245, respectively as further explained with respect to FIG. 17 below. To provide for a convenient means of inserting and removing the scuba tank 201 from the cup member 225, a vertical recess 250 is cut in the circular periphery of the cup member 225. The vertical recess 250 is best seen in FIGS. 12 and 13. FIGS. 13-17 are respectively a rear axonometric, front axonometric, plan view, bottom plan view and a section view taken along lines 17-17 of FIG. 15 of the present embodiment with the scuba tank 201 removed there from. The vertical recess 250 is preferably a V-shaped slot. The "V" is selectably closeable to vary the inner diameter of the cup member 225. An outer periphery 258 of the cup member 225 has a vertically extending channel 260 for receiving an adjustable strap assembly 265. The adjustable strap assembly 265 includes a strap 266 and a clasp assembly 268. In a first position, the clasp assembly 268 is open and the strap 266 has a first outer diameter permitting the vertical recess 250 to be open to its full extent and provide a clearance for the scuba tank 201. In a second position, the clasp assembly 268 is closed. The outer diameter of the strap 266 is reduced, compressing the cup member 225 and reducing the outer diameter of the channel 265. Consequently, the cup member 225 is moved to a closed position as illustrated in FIG. 14. This provides a tight fit retaining the scuba tank 201 in the cup member 225.

Referring now to FIG. 10, it will be seen that in a preferred form, the roller member 240 cooperates in providing a standing position for the transport system 210. The bottom of the roller member 240 at a horizontally rear portion of the cup member 225 and the lower extent of the cup member 225 at a horizontally front portion thereof define a horizontal plane 280 on which the system 210 may rest in an upright position. The horizontally rear portion of the cup member 225 has an elevated bottom 290 which serves as a platform for supporting the scuba tank 201. Vertically projecting below the platform 290 at a forward horizontal extent of the cup member 225 is a lip section 292. A user may use the lip section 292 as a grip. Consequently, the system 210 may be carried by a user placing one hand at the upper end 206 of the scuba tank 201 and another hand at the lip 292 of the cup member 225.

The roller member 240 is further described with reference to FIGS. 15 and 17. The axle members 244 and 245 may each comprise an L-shaped member 300 with a horizontal arm 301 projecting from the cup member 225 and a vertical arm 302 projecting from an upper surface of the cup member 225. The horizontal arms 301 are disposed along and axis 304 which intersects an interior of the cup member 225. This disposition of the axis 304 allows for a reduced radial distance of the axle 304 from a center of the cup member 225. Consequently, a wheel 242 and a wheel 243 do not project as far from the cup member 225 as they would if the axle 304 were outside the circular contour of the cup member 225. A smaller profile is thus provided to underwater vegetation and other objects.

The wheels 242 and 243 are each secured to one arm 301 by a securing means 306 such as a washer press fit onto the arm 301. Other well-known securing means may be used. The vertical arm 302 may be threaded at an upper-end thereof and receive a lock nut 310. The lock nut 310 may be an individual lock nut as illustrated in FIG. 17. Alternatively, the lock nut 310 can be secured to a handle assembly such as that illustrated in FIG. 5 in order to prevent securing a handle assembly to the cup member 225. The wheels 242 and 243 in one form are made of polycarbonate resin.

Figure 17:
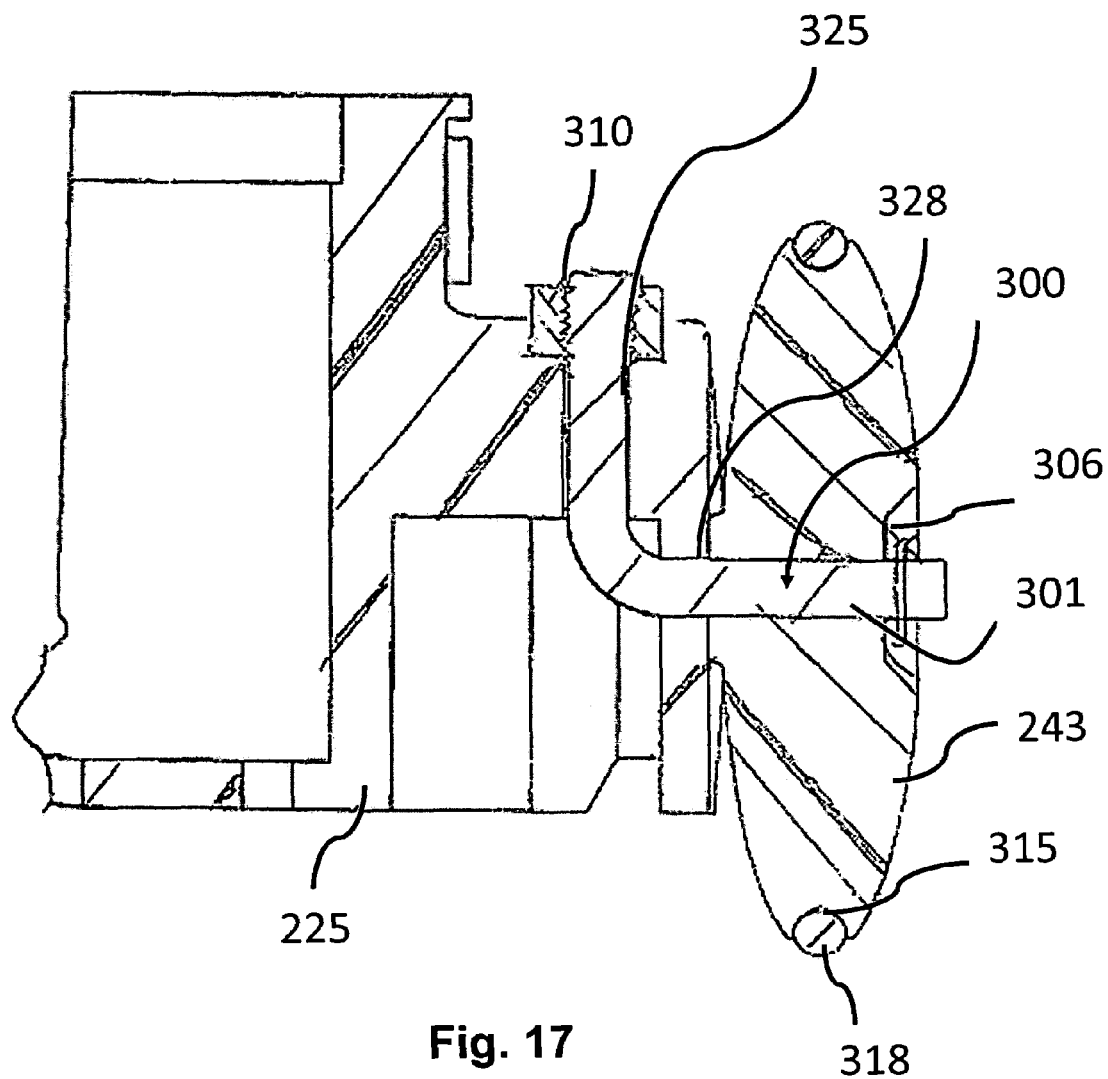

As seen in the embodiment of FIG. 17, the wheels may have an oval cross section with a recess 315 formed at an outer periphery thereof. The wheels 242 and 243 have one thickness at the center, or inner diameter, and a smaller thickness at their outer diameters. The recess 315 may receive an o-ring 318. A suitable material for the o-ring 318 is hard rubber. The o-ring 318 provides traction. The o-ring 318 is also easily replaceable so that where at the outer periphery of the roller member 240 does not require replacement of an entire wheel 242 or 243. The recess 315 is formed to accommodate different size o-rings which may serve different purposes. For example, a smaller diameter o-ring 318 may be more suitable for use over docks and parking lots. A larger o-ring 318 may be more suitable for use on a beach.

The L-shaped members 300 are received in projections 322 and 323 extending from the circular contour of the cup member 225. As best seen in FIG. 17, each vertical arm 302 extends through a bore 325. The horizontal arms 301 are each received in a slot 327. The slots 327 have a top end 328 against which the arms 301 stop when the vertical arms 302 are secured by the lock nuts 319. The positions of the slot top ends 328 are dimensioned to place the horizontal arms 301 on the axis 304.

As seen in FIG. 14, the platform portion 290 of the cup member 225 need not extend across the total horizontal extent of the inner diameter of the cup member 225. The platform member 19 includes a central aperture 330 defining an annular member 332 between the aperture 330 and vertical wall of the cup member 225. Additionally, circumferentially spaced apertures 334 are placed in the annual section 332, further reducing weight of the cup member 225.

Figure 15:
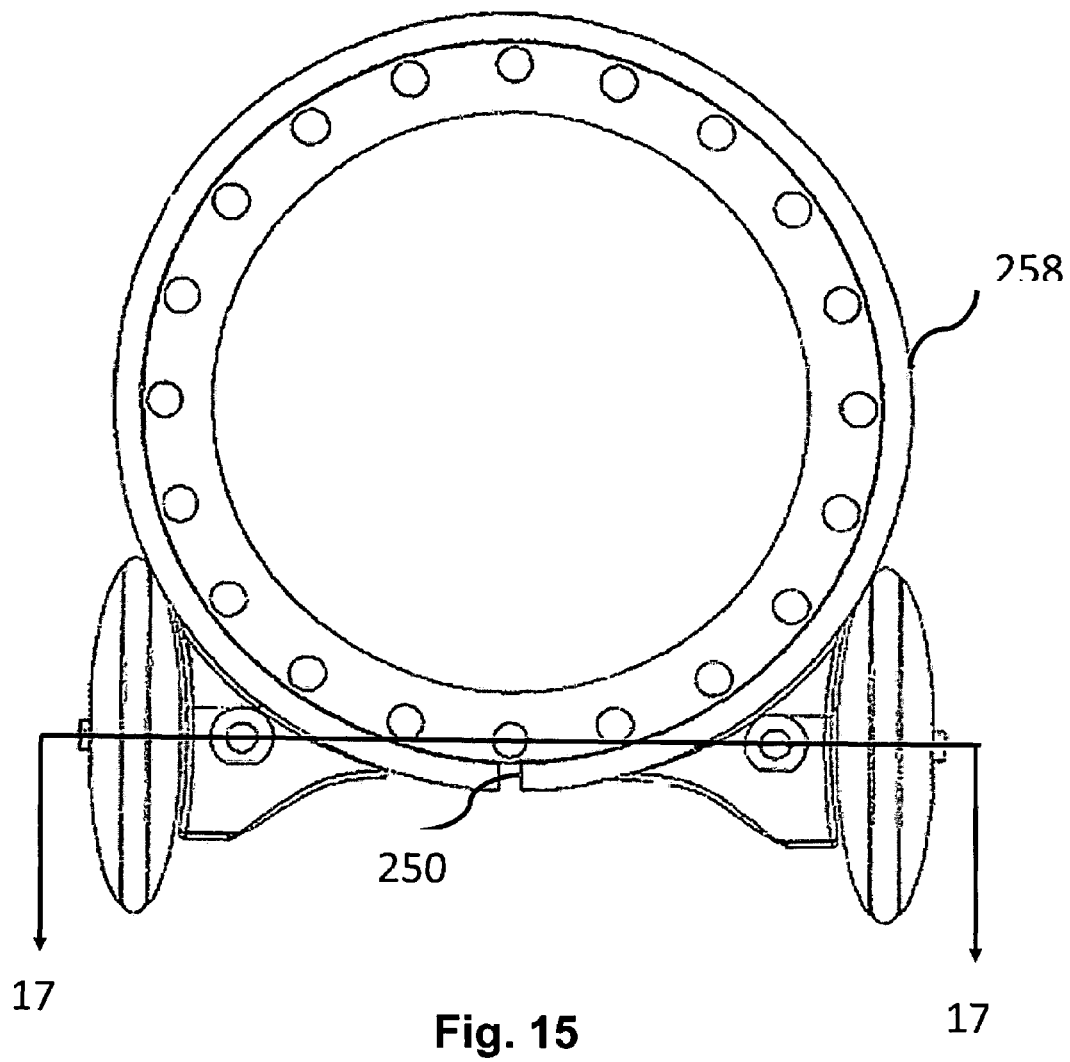
Figure 16:
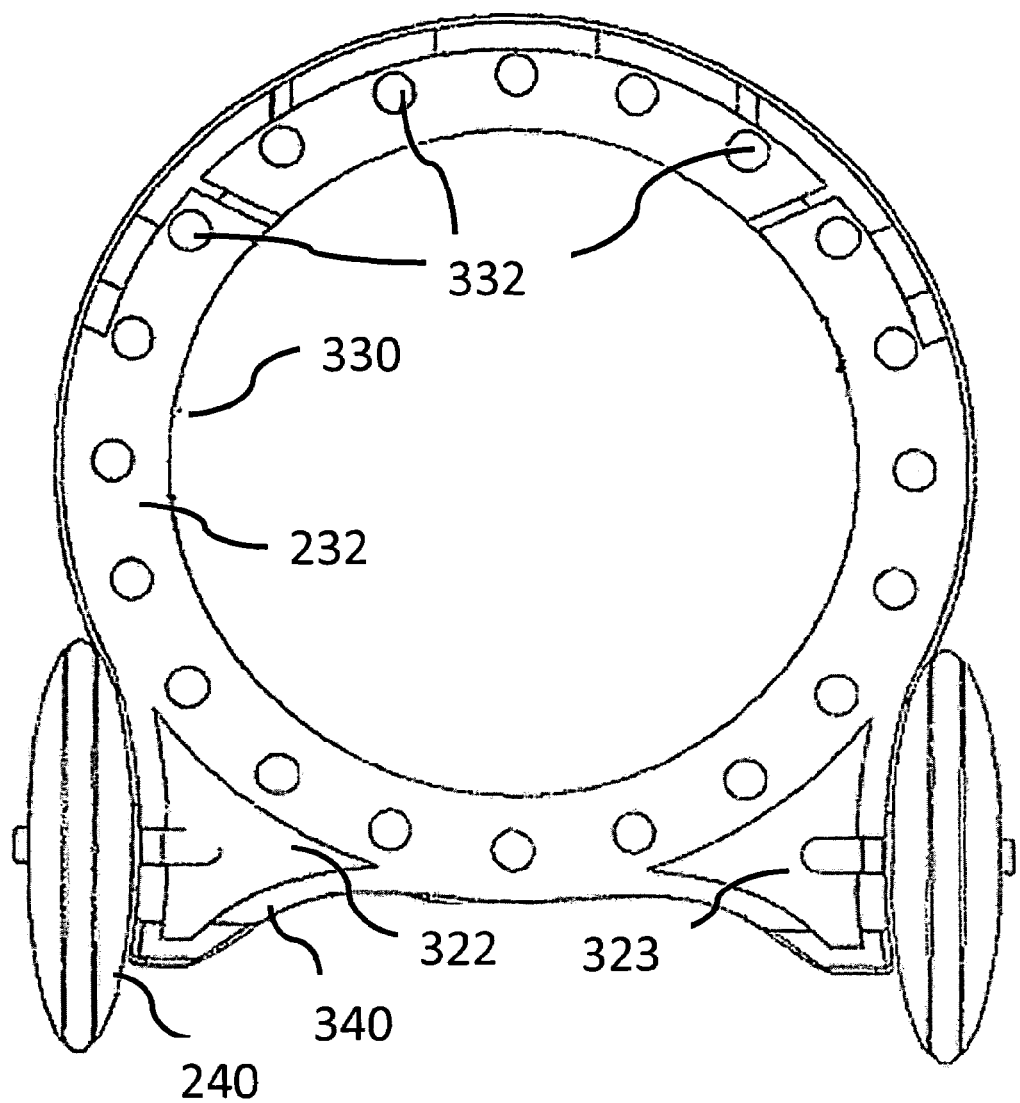

As will be seen in FIGS. 15 and 16, the structure of the transport assembly 220 will prevent rotation when the assembly 210 is restored in a horizontal position in a storage means. The cup member 225 and roller member 240 comprise means for preventing rotation. In other words, either a roller member 240 may provide a stop to prevent rotation or a corner member 340 projecting from a circular portion of the cup member 225 or both may prevent rotation. The description of stop means being comprised in the roller member and cup member 225 is used to denote that either or both of the members may be utilized to prevent rotation.

Figure 18:
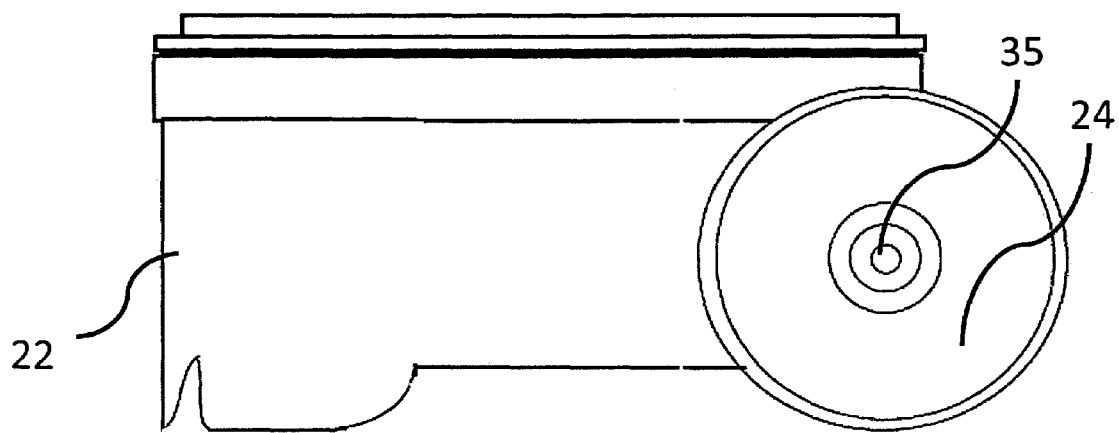
FIGS. 18 and 19 are an elevation and a plan of a further form of the embodiment of FIGS. 9-17.
Figure 19:
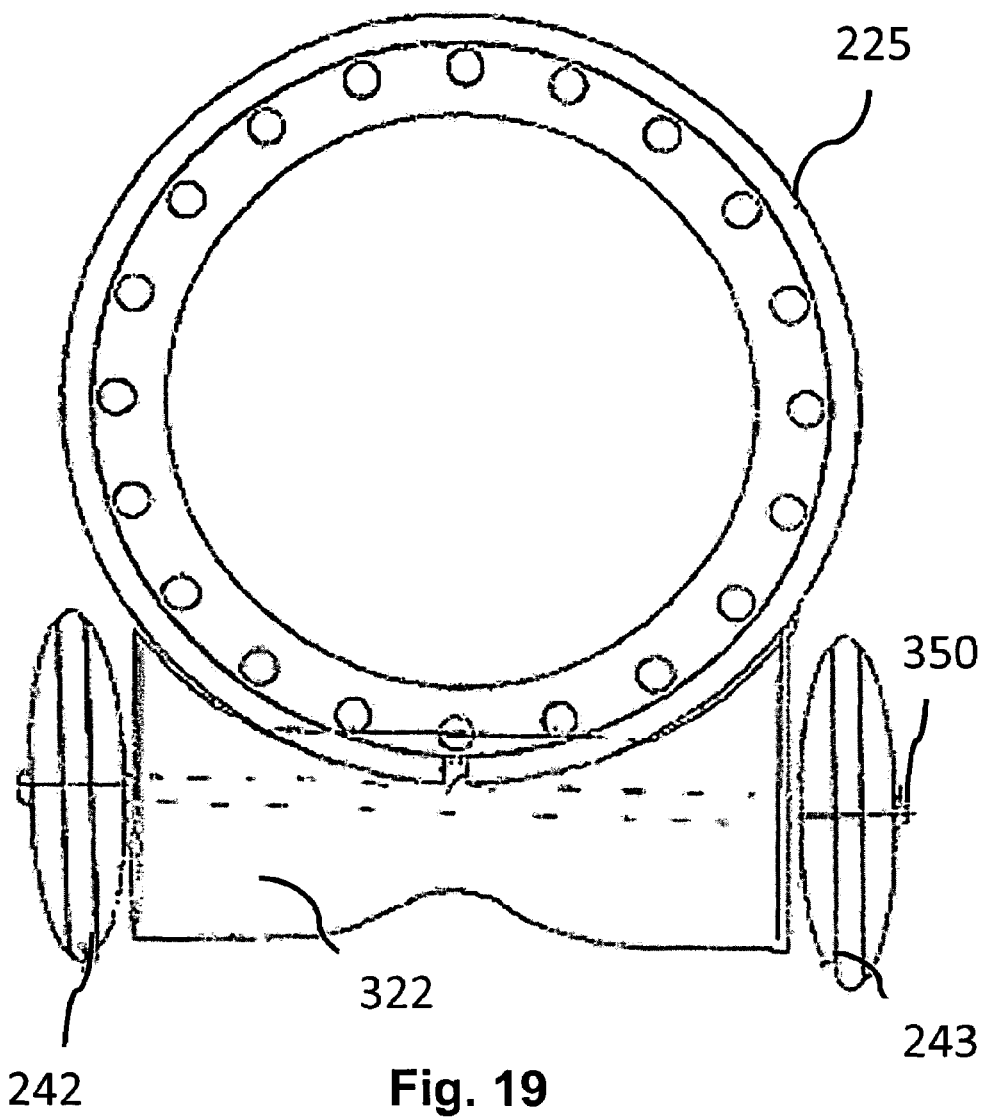

FIGS. 18 and 19 are an elevation and a plan view of a further embodiment in which wheels 242 and 243 are mounted to a one-piece axle 350. Projections 322 and 323 are dimensioned to provide bores 352 to locate the axle 350 outside the circular contour of the cup member 225.

Many departures may be made to provide a transport apparatus constructed in accordance with the present invention as well as a system comprising a transport apparatus and scuba tank. If desired, further aerodynamic shaping could be provided. For example, the upper surface of the annular section 54 could be rounded rather than flat. The entire transport mechanism 20 could be surrounded in a spherical, teardrop or other rounded shape. Fins could be provided. The restraining strap 28 could be a unitary elastomeric member. Many further modifications may be made in accordance with the above teachings to provide an apparatus and system which provides for convenient transportation and for unobtrusive use underwater.

Embodiments of the invention can be varied in many ways. Such variations are not to be regarded as a departure from the spirit and scope of the invention, and all such modifications are intended to be within the scope of the invention.

What is claimed is:

1. A scuba tank mobility device comprising: a cup member to receive a lower end of a scuba tank in an interior of said cup member, said cup member comprising an annular wall, and a lower support surface, a roller member mounted to said cup member, said cup member supporting the scuba tank in a first state in which said mobility device is in equilibrium to rest on a surface, and said cup member being tiltable to transfer weight to said roller member and free said lower support surface of engagement with the surface, wherein said cup member has a first, fixed diameter and is compressible to have a reduced diameter and further comprising tightening means actuatable from a first position to a second position to reduce diameter of said cup member from said first diameter to the second diameter.

2. A device according to claim 1 wherein said tightening means comprises a cutout in a wall of cup member and fastening means to draw said cutout toward a closed position.

3. A device according to claim 2 wherein fastening means comprises a strap and a clamp to tighten said strap and wherein said cup member comprises an annular channel receiving said strap.

4. A scuba tank mobility device comprising: a cup member to receive a lower end of a scuba tank in an interior of said cup member, said cup member comprising an annular wall, and a lower support surface, a roller member mounted to said cup member, said roller member comprising first and second coaxially mounted wheels to rotate about a common axis, said cup member supporting the scuba tank in a first state in which said mobility device is in equilibrium to rest on a surface, and said cup member being tiltable to transfer weight to said roller member and free said lower support surface of engagement with the surface is, said cup member further comprising a platform having an upper surface to support a bottom of the scuba tank and at least one lip member extending below a lower surface of the platform, said lip member subtending a preselected arc of said cup member and wherein lip member and said roller member define a support for said device in said first state, wherein said axis intersects the interior of said cup member.

5. A device according to claim 4 wherein said cup member comprises an annular wall surrounding the interior thereof and said cup member further comprises first and second projections, said device further comprising first and second axle members respectively received in said first and second projections, said first and second wheels being supported to said first and second axle members respectively.

6. A device according to claim 5 wherein each said axle member is L-shaped and has first and second legs and wherein each said projection comprises a vertically extending slot to receive a first leg and a vertical bore communicating with said slot and having an upper end communication with an upper surface of a projection to receive the second leg, said slot having a dimension to locate said first leg on said axis.

7. A device according to claim 6 wherein an end of said second leg is threaded and wherein said device further comprises a nut rotatable to secure each axle member between said slot and the upper surface of said projection.

8. A scuba tank mobility device comprising: a cup member to receive a lower end of a scuba tank in an interior of said cup member, said cup member comprising an annular wall, and a lower support surface, a roller member mounted to said cup member, said roller member comprising first and second coaxially mounted wheels to rotate about a common axis, said cup member supporting the scuba tank in a first state in which said mobility device is in equilibrium to rest on a surface, and said cup member being tiltable to transfer weight to said roller member and free said lower support surface of engagement with the surface is, said cup member further comprising a platform having an upper surface to support a bottom of the scuba tank and at least one lip member extending below a lower surface of the platform, said lip member subtending a preselected arc of said cup member and wherein lip member and said roller member define a support for said device in said first state, wherein said wheels each have a cross section tapered from an inner diameter to an outer diameter.

9. A device according to claim 8 wherein each wheel comprises a groove at its outer diameter capable of supporting an o-ring having a selected one of a plurality of diameters.

10. A device according to claim 9 further comprising an o-ring mounted in said groove at the outer diameter of each wheel.

11. A scuba tank mobility system comprising: a cup member to receive a lower end of a scuba tank in an interior of said cup member, said cup member comprising an annular wall, and a lower support surface, a roller member mounted to said cup member, said cup member supporting the scuba tank in a first state in which said mobility device is in equilibrium to rest on a surface, said cup member being tiltable to transfer weight to said roller member and free said lower support surface of engagement with the surface, said system further comprising a scuba tank having a first, lower end mounted in said up member, said scuba tank further comprising a second, upper end having a nipple end, said system being movable from said first state to said second state by application of a force moment to said nipple end of said scuba tank, wherein said cup member comprises a platform having an upper surface to support a bottom of the scuba tank and at least one lip member extending below a lower surface of the platform, and wherein lip member and said roller member define a support for said device in said first state, and further comprising at least one protector member affixed to said scuba tank.

12. A device according to claim 11 wherein each said protector member comprises an elongated member extending substantially parallel to an axis of said scuba tank.

* * * * *